Feb. 7, 1961 N. W. CROSBY 2,970,356
CABLE CLAMP AND CONNECTOR
Filed April 25, 1958
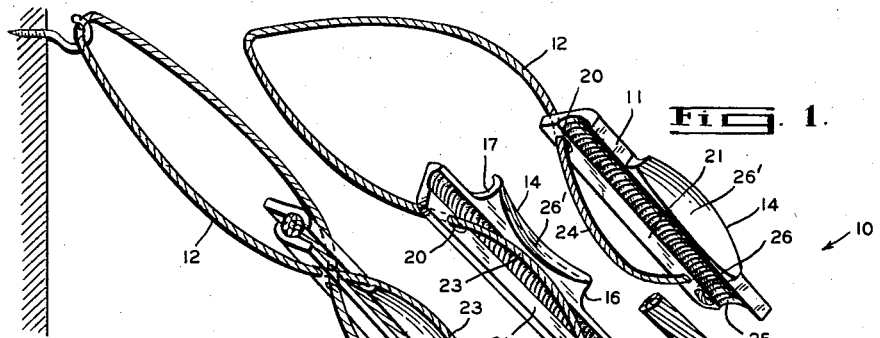
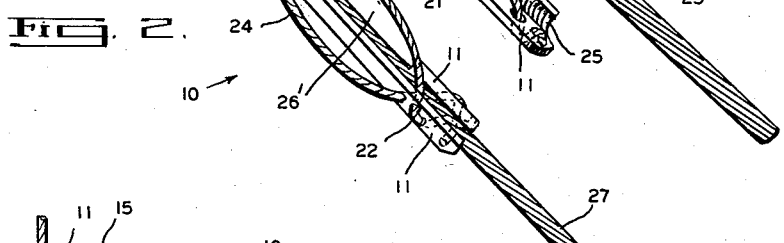
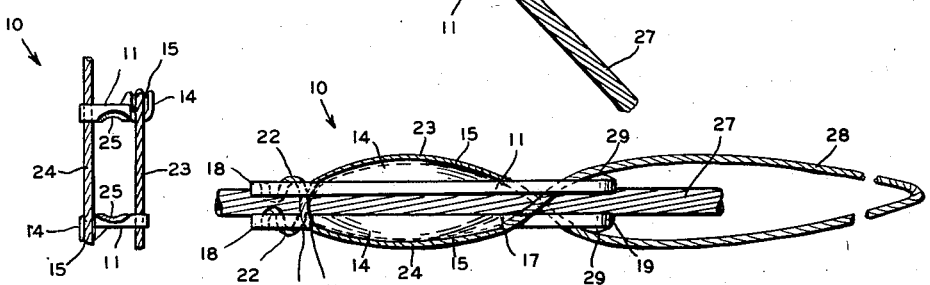
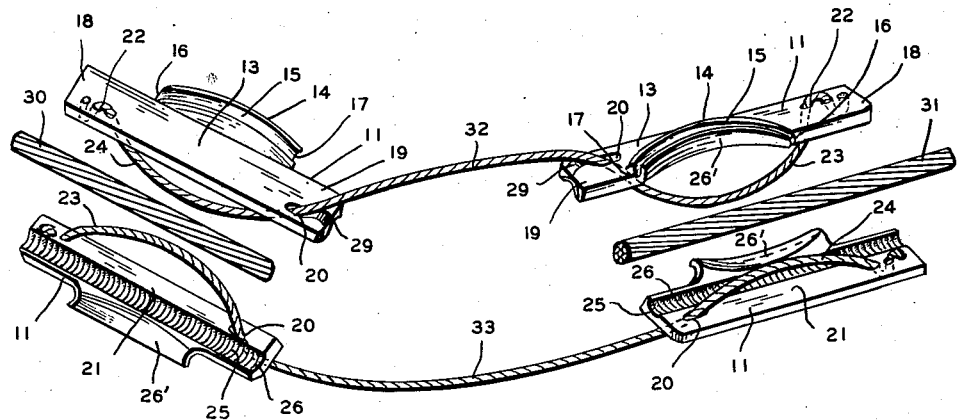
INVENTOR
NOBLE W. CROSBY
ATTY.

United States Patent Office 2,970,356
Patented Feb. 7, 1961

2,970,356

CABLE CLAMP AND CONNECTOR

Noble Wellington Crosby, R.R. 1, Trenton,
Ontario, Canada

Filed Apr. 25, 1958, Ser. No. 731,004

10 Claims. (Cl. 24—115)

This invention relates to self-tightening clamp devices, especially for anchoring wires or cables to a fixed support and for connecting wires or cables in series.

The principal object of this invention is to provide a self-tightening clamp device having a simple, unitary construction of few parts, and having excellent clamping characteristics, especially for use in anchoring a span of wire or cable or for use in connecting wires or cables in series.

Another principal object of this invention is to provide a self-tightening clamp device which will positively engage and grip a wire or cable and automatically tighten its grip over a wide range of wire or cable diameters without damage or abrasion to the cable or insulation.

Further, it is an important object of this invention to provide a clamp device whose members are self-aligning to obviate stresses in the wire or cable where it leaves the clamp device.

Still another important object resides in providing a clamp device which can be readily manipulated for mounting on or disengaging from a wire or cable.

Another very important object of this invention is to provide a clamp device which is strong and durable and which can be manufactured very economically.

The principal feature of this invention resides in providing a self-tightening clamp device comprising only a pair of clamp members and a flexible wire or other suitable element, the clamp members being identical, each clamp member having a passageway formed therethrough and the flexible linear element passing through said passageways and being secured to each clamp member to define loop portions therewith, and each clamp member having a guideway formation in spaced relation to its loop portion for receiving and slidably engaging with the loop portion of the opposing clamp member, the clamp members when arranged in opposing offset clamping relation moving toward one another under the application of force to the flexible element.

Another important feature of this invention resides in providing a clamp device as aforesaid in which the clamp elements are identical, inasmuch as when the clamp members are disposed in opposed clamping relation they have opposite symmetry and since the loop and guideway formations with which the loops engage correspond in extent and disposition, the clamp device is automatically self-aligning.

Still another important feature of this invention resides in providing a unitary clamp device in which the clamp members are easily separable or completely disengageable, one from the other for ready adjustment or for application to the end of a wire or cable, yet the device remains a unit, thereby obviating any additional handling and care required with devices which have separate parts.

Another feature of this invention resides in providing a clamp device as aforesaid whose clamp elements are separable, whereby a pair of clamp devices whose clamp elements are separated can be arranged in side by side relation to provide a pair of opposing clamp devices joined by their flexible wire elements which can be used for connecting a pair of wires or cables.

These and other objects and features will be found in the following description to be read in conjunction with the sheet of drawings in which:

Figure 1 is a perspective view of the clamp device showing the clamp members separated and about to be applied to a cable;

Figure 2 is a perspective view of the clamp device of Figure 1 mounted on a cable;

Figure 3 is a side elevational view of the clamp device of Figure 2 mounted on a cable;

Figure 4 is an end elevational view of the clamp device with the clamping elements in opposed clamping relation; and Figure 5 is a perspective view of a pair of clamp devices arranged in side by side relation for connecting a pair of cables in series.

With reference to Figures 1, 4 and 5 of the sheet of drawings, the clamp device generally designated at 10 comprises a pair of identical clamp elements 11 which are secured one at each end to a flexible wire or cable element 12.

Each clamp element 11 has an elongate body portion 13 which is provided along one longitudinal edge with a raised arcuate guideway formation 14 formed with an arcuate channel 15 which is open at the ends 16 and 17, with ends 16 and 17 being spaced from the front end 18 and rear end 19, respectively, of body portion 13.

Each clamp element 11 is formed with an aperture 20 adjacent to the longitudinal edge opposite to the guideway 14 and spaced from the rear end 19 of body portion 13, a distance corresponding to the spacing of end 17 of the guideway formation 14.

The flexible wire element 12 passes through the aperture 20 and below the clamping surface 21 of clamp member 11 and is secured adjacent to the front end 18 of the clamp member 11 as at 22 at a point corresponding to the spacing of end 16 of guideway 14 from front end 18, to define with each clamp member 11, respectively, extensible loop portions 23 and 24.

It will be appreciated that the plane of the channel 15 and the plane passing through securing means 22 and aperture 20 are substantially parallel in order that the variable loops 23 and 24 will engage with the opposing channels 15 of guideways 14.

The clamping surfaces 21 of clamp elements 11 are provided with complementary longitudinal grooves 25 which are serrated as at 26 in order to achieve maximum grip with a wire or cable to be secured.

With reference to Figure 4, it will be seen that the centre line of the grooves 25 is equidistant from the plane of the loop portions 23 and 24 and channels 15, when the clamp members 11 are disposed in clamping relation.

This arrangement obviates any tendency for the suspended span of wire or cable to twist or turn, as the moment arms are substantially balanced.

To facilitate interconnecting of the loops 23 and 24, and guideways 14, the guideways 14 are flared as at 26' allowing the loop portions 22 to slide upwardly when the clamp members 11 are disposed in opposed clamping relation for interengagement.

With reference to Figures 1, 2 and 3, it will be seen that the clamping members 11 fit together in only one way and since they are identical, they can only assume one interlocked disposition. Hence, the clamp members will cooperate in the same manner when a pair of devices are arranged in opposed clamping relation as will be seen in Figure 5.

With reference to Figure 3, when the clamping elements 11 have been placed over a cable 27, the loop portions 23 and 24 ride in the opposing channels 15 of guideways 14 and under the application of force to the loop 28, defined by wire element 12, the clamp elements 11 will exert a force in a direction perpendicular to the clamping plane, According to applicant's construction, it will be appreciated that there is a clamping force exerted on cable 27 equal to twice the force applied to loop 28 by virtue of the mechanical advantage derived by passing the flexible element over the arcuate guideways 14 and anchoring the opposing ends in the opposed clamping elements.

In order to facilitate clamping action, each clamp element 11 is provided with a raised bearing surface 29 rearwardly of aperture 20 so that the wire element 12 will ride up and over the upper surface of clamping elements 11. This prevents abrasion of the wire at the points of contact of the clamp elements 11 and lengthens the life of the device.

Also, it will be appreciated that the spacing of the guideway formations 14 and loop portions 23 and 24 serves to align the two clamp members and the clamp members 11 will not move relative to one another when force is applied to loop portion 28 whereby front ends 18 of clamp elements 11 are maintained in fixed relation and balance the forces on cable 27 where it leaves the clamp device.

It will also be appreciated from Figure 5 that the clamping device is unitary and yet at the same time the clamping elements 11 can be separated and arranged in side by side relation with an identical clamp device whose clamping elements will cooperate to provide a pair of opposed clamping devices for securing a pair of cables 30 and 31 together, the clamping action on the two cables being exerted on applying tension to the intermediate portions 32 and 33 of wire elements 12. In this manner a pair of cables can be anchored or connected in series.

While the preferred embodiment of the invention has been described and illustrated, it will be appreciated that various changes in modifications of the structure of the clamp device may be made without departing from the scope of the invention as defined in the following claims.

What I claim is:

1. A clamp device comprising a pair of relatively separable clamp members each presenting an upper surface and a lower clamping surface and each having an aperture formed therethrough, said clamp members being held together by means of a flexible linear element secured at one end to one of said clamping members and at the other end to the other of said clamp members, said flexible linear element passing through the apertures in each clamp member to define extensible loop portions with the lower clamping surfaces thereof, each clamp member having an elongated guideway formation in spaced relation to its loop portion for slidably engaging with a loop portion of the opposing clamp member when said clamp members are arranged in opposing offset clamping relation.

2. A clamp device according to claim 1 in which each of said clamp members comprises an elongate body portion having a longitudinal groove formed in one face thereof with the loop portion of each member extending longitudinally thereof at one side of said groove and below said afore-mentioned face, and said guideway formation extends longitudinally of said body portion at the opposite side of said groove on the opposite face of the clamp member, the ends of said guideway formations and said loops terminating at corresponding points inwardly spaced from the ends of said body portions.

3. A clamp device according to claim 2 in which each of said guideway formations is arcuate.

4. A clamp device according to claim 3 in which each of said guideway formations is flared on its underside.

5. In a clamp device, a pair of identical separable clamping elements each comprising a pair of elongated plates bounded by front, rear and longitudinal side edges, said plates each having aperture means formed therethrough in the rearward portion thereof, and adjacent to one longitudinal side edge, said plate presenting a clamping surface on one face and having an arcuate elongated guideway formation on the opposite face and extending along the longitudinal side edge opposite to the first mentioned longitudinal side edge, and a flexible linear element connected between the forward portions of each plate and passing below the clamping surface thereof and through its aperture to define therewith a longitudinally extending loop means, the loop means of each element being arranged to engage over the guideway formation of the opposing clamp member when same are disposed in opposing clamping relation whereby under the application of force to the flexible element, said clamping elements are adapted to be moved towards one another.

6. A device according to claim 5 in which each elongated guideway formation has an extent corresponding to the spacing between the aperture means and the point of attachment of said flexible wire element to the clamping element.

7. A device according to claim 6 in which each of said guideway formations are flared on its underside.

8. A clamp device comprising a pair of elongated clamping members each presenting an upper surface and a lower clamping surface and having front and rear ends, each of said clamping members having an aperture formed therethrough adjacent to the rear end and at one side, a flexible linear element secured at one end to the front end of one of said clamp members and at the other end to the front end of the other of said clamp members, the flexible linear element passing through the apertures and below the lower clamping surface of the clamp member to define longitudinal loop portions therewith, each clamp member having an elongated guideway formation disposed in spaced substantially parallel relation to its loop portion and having an extent corresponding to the spacing between said aperture and the point of securement of said linear element to its front end, said guideway formations being adapted to removably receive and engage with the loop portion of the opposing clamp member when said clamp members are arranged in opposing offset clamping relation.

9. A wire holding device comprising a pair of elongated clamp members each presenting upper and lower surfaces bounded by front, rear and side edges, each member having an aperture formed therethrough adjacent to the rear edge and at one side edge, a length of flexible wire element secured at one end to the front portion of one of said clamp members and at the other end to the front portion of the other of said clamp members, the flexible wire element passing through the apertures, and below the lower surface of each clamp member to define longitudinally extending loop portions therewith and along the aforesaid side edge of each clamp member, each clamp member having an arcuate longitudinal guideway formation disposed along the side edge opposite to its loop portion and in spaced substantially parallel relation thereto for releasably engaging with the loop portion of the opposing clamp member when said members are arranged in opposing clamping relation.

10. A clamp device comprising a pair of identical clamp members bounded by a front edge, rear edge and side edges, each clamp member presenting an upper surface and a lower clamping surface and each member having an aperture formed through the rearward portion thereof, a flexible linear element secured at one end to the front portion of one of said clamp members and at the other end to the front portion of the other of said clamp members, said flexible linear element passing through each of the apertures, and below the lower clamping surfaces of the clamp members, respectively, to define extensible loop portions therewith, and each of said clamp members having a guideway formation intermediately of its ends for removably receiving and slidably engaging with the loop portion of the opposing clamp member when said clamp members are disposed in opposing clamping relation.

References Cited in the file of this patent

UNITED STATES PATENTS

| | | |
|---|---|---|
| 1,159,616 | Swisher | Nov. 9, 1915 |
| 1,903,148 | Swisher | Mar. 28, 1933 |
| 2,110,408 | Tallman | Mar. 8, 1938 |